United States Patent
Lim et al.

(10) Patent No.: US 10,567,131 B2
(45) Date of Patent: Feb. 18, 2020

(54) METHOD AND APPARATUS FOR TRANSMITTING AND RECEIVING HE RA SU PPDU IN A WLAN

(71) Applicant: LG ELECTRONICS INC., Seoul (KR)

(72) Inventors: Dongguk Lim, Seoul (KR); Eunsung Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/620,551

(22) Filed: Jun. 12, 2017

(65) Prior Publication Data

US 2017/0359158 A1    Dec. 14, 2017

Related U.S. Application Data

(60) Provisional application No. 62/349,610, filed on Jun. 13, 2016, provisional application No. 62/350,188, filed on Jun. 15, 2016.

(51) Int. Cl.
*H04L 5/00* (2006.01)
*H04W 72/04* (2009.01)
*H04W 84/12* (2009.01)

(52) U.S. Cl.
CPC .......... *H04L 5/0046* (2013.01); *H04L 5/0007* (2013.01); *H04L 5/0044* (2013.01); *H04W 72/048* (2013.01); *H04W 84/12* (2013.01)

(58) Field of Classification Search
CPC .......... H04W 52/0245; H04W 72/048; H04W 84/12; H04L 5/0046; H04L 5/0044; H04L 5/0007; H04L 5/0053; H04L 1/0001
See application file for complete search history.

(56) References Cited

U.S. PATENT DOCUMENTS

| 2015/0117433 | A1  | 4/2015 | Zhang et al. |
| 2017/0034829 | A1* | 2/2017 | Yang ................. H04W 72/0486 |
| 2017/0142659 | A1* | 5/2017 | Noh ................... H04W 52/0245 |

FOREIGN PATENT DOCUMENTS

| EP | 3206351    | 8/2017 |
| WO | 2016056719 | 4/2016 |
| WO | 2017111567 | 6/2017 |

OTHER PUBLICATIONS

PCT International Application No. PCT/KR2017/000962, Notification of Transmittal of the International Search Report and the Written Opinion of the International Searching Authority, or Declaration dated Apr. 25, 2017, 12 pages.

(Continued)

*Primary Examiner* — Vinncelas Louis
(74) *Attorney, Agent, or Firm* — Lee Hong Degerman Kang Waimey

(57) ABSTRACT

A method for transmitting data by a first station (STA) in a wireless local area network (WLAN) system is disclosed. The method includes configuring, as a radio frame for transmission of the data, a high efficiency extended range single user physical protocol data unit (HE ER SU PPDU) in which a high efficiency signal A (HE-SIG-A) field is repeated, and transmitting the configured HE ER SU PPDU to a second STA in a resource unit (RU) of one of a first type and a second type, the first type having a size of 106 tones and the second type having a size of 242 tones. If the HE ER SU PPDU is transmitted in an RU of the first type, the HE ER SU PPDU is transmitted in an RU of the first type at a fixed position in a primary 20-MHz channel.

14 Claims, 8 Drawing Sheets

HE-SIG-A field of an HE SU PPDU and HE extended range SU PPDU

| Two Parts of HE-SIG-A | Bit | Field | Number of bits | Description |
|---|---|---|---|---|
| | B19-B20 | Bandwidth | 2 | For an HE SU PPDU : Set to 0 for 20 MHz Set to 1 for 40 MHz Set to 2 for 80 MHz Set to 3 for 160 MHz and 80+80 MHz<br><br>For an HE extended range SU PPDU : Set to 0 for 242-tone RU Set to 1 for right 106-tone RU within the primary 20 MHz |

(56) References Cited

OTHER PUBLICATIONS

European Patent Office Application Serial No. 17175776.8, Search Report dated Oct. 25, 2017, 8 pages.
Zhang, J. et al., "Discussion on HE Extended Range SU PPDU," Huawei Technologies, doc.: IEEE 802.11-16/0047r0, Jan. 2016, 21 pages.
Porat, R. et al., "Preamble Formats," Broadcom Corporation, doc.: IEEE 802.11-15/1353r1, Nov. 2015, 21 pages.
Vermani, S. et al., "Extended Range Support for 11ax," Qualcomm Incorporated, doc.: IEEE 802.11-15/1309r1, Nov. 2015, 17 pages.
Noh, Y. et al., "Considerations on Range Extension with SIG-A Repetition," Newracom Incorporated, doc.: IEEE 802.11-15/1091r0, Sep. 2015, 12 pages.
Stacey, R et al., "Proposed TGax draft specification," Intel Corporation, doc.: IEEE 802.11-16/0024r1, XP068104773, Mar. 2016, 160 pages.

* cited by examiner

HE SU PPDU format

HE MU PPDU format

HE trigger-based PPDU format

HE extended range SU PPDU format

Table - HE-SIGA in SU PPDU

| field | number of bits |
|---|---|
| DL/UL | 1 |
| format | 1 |
| BSS color | 6 |
| Spatial Reuse | 4 |
| TXOP duration | 7 |
| BW | 2 |
| MCS | 4 |
| GI + LTF size | 2 |
| Coding | 1 |
| LDPC extra symbol | 1 |
| Nsts | 3 |
| STBC | 1 |
| TxBF | 1 |
| DCM | 1 |
| A-factor | 2 |
| PE | 1 |
| Beam change | 1 |
| Doppler | 1 |
| CRC | 4 |
| Tail | 6 |
| total bits | 50 |

HE-SIG-A field of an HE SU PPDU and HE extended range SU PPDU

| Two Parts of HE-SIG-A | Bit | Field | Number of bits | Description |
|---|---|---|---|---|
| | ..... | | | |
| | B19-B20 | Bandwidth | 2 | For an HE SU PPDU : <br> Set to 0 for 20 MHz <br> Set to 1 for 40 MHz <br> Set to 2 for 80 MHz <br> Set to 3 for 160 MHz and 80+80 MHz <br><br> For an HE extended range SU PPDU : <br> Set to 0 for 242-tone RU <br> Set to 1 for right 106-tone RU within the primary 20 MHz |
| | ..... | | | |

FIG. 11

HE-SIG-A field of an HE SU PPDU and HE extended range SU PPDU

| Two Parts of HE-SIG-A | Bit | Field | Number of bits | Description |
|---|---|---|---|---|
| | ..... | | | |
| | B7 | DCM | 1 | Indicates whether or not DCM is applied to the Data field for the MCS indicated.<br>  Set to 1 to indicate that DCM is applied to the Data field<br>  Set to 0 to indicate that DCM is not applied to the Data field<br>DCM is only applied for MCS0, MCS1, MCS3 and DCS4.<br>DCM is only applied for 1 and 2 spatial streams.<br>DCM is not applied when STBC is used. |
| | ..... | | | |

FIG. 12

HE-SIG-A field of an HE SU PPDU and HE extended range SU PPDU

| Two Parts of HE-SIG-A | Bit | Field | Number of bits | Description |
|---|---|---|---|---|
| | ..... | | | |
| | B3-B6 | MCS | 4 | For an HE SU PPDU :<br>  Set to $n$ for MCS$n$, where $n = 0, 1, 2, ....., 11$<br>  Values 12-15 are reserved<br><br>For HE extended range SU PPDU with Bandwidth field set to 0(242-tone RU):<br>  Set to $n$ for MCS$n$, where $n = 0, 1, 2$<br>  Values 3-15 are reserved<br>For HE extended range SU PPDU with Bandwidth field set to 1 (right 106-tone RU in P20):<br>  Set to 0 for MCS 0<br>  Values 1-15 are reserved |
| | ..... | | | |

FIG. 13

| field | number of bits |
|---|---|
| DL/UL | 1 |
| format | 1 |
| BSS color | 6 |
| Spatial Reuse | 4 |
| TXOP duration | 7 |
| BW | 2 |
| MCS | 4 |
| GI + LTF size | 2 |
| Coding | 1 |
| LDPC extra symbol | 1 |
| RU size | 2 |
| RU location | 3(or 2 or 1) |
| STBC | 1 |
| TxBF | 1 |
| DCM | 1 |
| A-factor | 2 |
| PE | 1 |
| Beam change | 1 |
| Doppler | 1 |
| CRC | 4 |
| Tail | 6 |
| total bits | 52(or 51 or 50) |

1310 — RU size
1320 — RU location

METHOD AND APPARATUS FOR TRANSMITTING AND RECEIVING HE RA SU PPDU IN A WLAN

CROSS REFERENCE

Pursuant to 35 U.S.C. § 119(e), this application claims the benefit of U.S. Provisional Application No. 62/349,610, filed on Jun. 13, 2016 and 62/350,188, filed on Jun. 15, 2016, the contents of which are all hereby incorporated by reference herein in their entirety.

BACKGROUND OF THE INVENTION

Field of the Invention

The present disclosure relates to a wireless local area network (WLAN), and more particularly, to a method and apparatus for transmitting and receiving a high efficiency extended range single user physical protocol data unit (HE ER SU PPDU) in a WLAN.

Discussion of the Related Art

Although a frame transmission method as proposed below is applicable to various wireless communication systems, it will be described in the context of a WLAN system as an exemplary system to which the present disclosure is applicable.

Standards for WLAN technology have been developed as institute of electrical and electronics engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying multiple input multiple output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

A station (STA) conforming to the IEEE 802.11ax standard may be referred to as a high efficiency (HE) STA, and a physical layer radio frame used in a HE system may be referred to as a HE physical protocol data unit (HE PPDU).

Each element of a PPDU available in the HE system will be described below.

FIG. 1 is a view referred to for describing initial discussion of each element of a HE PPDU.

In IEEE 802.11ax, a legacy 1× symbol structure (3.2 μs) may be adopted for a part of a frame up to HE-SIGs (HE-SIG A and HE-SIG B), and a frame structure having a 4× symbol (12.8 μs) structure may be used for HE-preamble and Data of the frame, as illustrated in FIG. 1. Unless contradicting the following description, there is no problem with applying the present disclosure even though the above structure is changed.

An L-part may be configured as in a legacy wireless fidelity (Wi-Fi) system, and thus may include a legacy short training field (L-STF), a legacy long training field (L-LTF), and a legacy signal (L-SIG). Generally, the L-SIG preferably carries packet length information. A HE-part is a new part configured for the IEEE 802.11ax standard (High Efficiency). HE-SIGs (HE-SIG A and HE-SIG B) may be interposed between the L-part and a HE-STF, providing common control information and user-specific information. Specifically, the HE-SIGs may be configured separately as HE-SIG A for providing common control information and HE-SIG B for providing user-specific information.

Although the above HE PPDU format is applicable to all data transmissions of a STA, it is preferred to make a slight modification to the HE PPDU format according to a transmission state of the STA in order to increase system efficiency.

SUMMARY OF THE INVENTION

Accordingly, an aspect of the present disclosure is to provide physical protocol data unit (PPDU) formats available in a high efficiency (HE) system, particularly a method for transmitting and receiving a high efficiency extended range single user physical protocol data unit (HE ER SU PPDU), when a robust transmission is needed.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the disclosure, as embodied and broadly described herein, a method for transmitting data by a first station (STA) in a wireless local area network (WLAN) system is disclosed includes configuring, as a radio frame for transmission of the data, a high efficiency extended range single user physical protocol data unit (HE ER SU PPDU) in which a high efficiency signal A (HE-SIG-A) field is repeated, and transmitting the configured HE ER SU PPDU to a second STA in a resource unit (RU) of one of a first type and a second type, the first type having a size of 106 tones and the second type having a size of 242 tones. If the HE ER SU PPDU is transmitted in an RU of the first type, the HE ER SU PPDU is transmitted in an RU of the first type at a fixed position in a primary 20-MHz channel.

The radio frame for transmission of the data may include a HE single user (SU) PPDU, a HE multi-user (MU) PPDU, and a HE trigger-based PPDU in addition to the HE ER SU PPDU. If the data is transmitted in the HE MU PPDU or the HE trigger-based PPDU, an RU of a third type having a size of 26 tones and an RU of a fourth type having a size of 52 tones may be used in addition to an RU of the first type and an RU of the second type.

If the data is transmitted in the HE ER SU PPDU, an RU of the third type and an RU of the fourth type may not be used.

If the data is transmitted in the HE SU PPDU, a bandwidth (BW) field of the HE-SIG A field may indicate a transmission BW of the HE SU PPDU among BWs being multiples of 20 MHz. If the data is transmitted in the HE ER SU PPDU, the BW field of the HE-SIG A field may indicate whether the HE ER SU PPDU uses an RU of the first type or an RU of the second type.

The data may be transmitted in a data field of the HE ER SU PPDU in a repeated transmission scheme in which available resources of the data field are divided into two parts and the same information is repeatedly transmitted twice. In this case, the HE-SIG A field may include a 1-bit field indicating whether the repeated transmission scheme is applied to the data field.

If the data is transmitted in the HE SU PPDU, a modulation and coding scheme (MCS) field of the HE-SIG A field may indicate an applied MCS level in 4 bits. If the data is transmitted in the HE ER SU PPDU, the MCS field of the HE-SIG A field may represent only three or fewer MCS levels.

In another aspect of the present disclosure, a STA for transmitting data in a WLAN system includes a processor for configuring, as a radio frame for transmission of the data, a high efficiency extended range single user physical protocol data unit (HE ER SU PPDU) in which a high efficiency signal A (HE-SIG-A) field is repeated, and a transceiver for transmitting the configured HE ER SU PPDU. The transceiver transmits the HE ER SU PPDU in an RU of one of a first type and a second type, the first type having a size of 106 tones and the second type having a size of 242 tones, and if the HE ER SU PPDU is transmitted in an RU of the first type, the processor controls transmission of the HE ER SU PPDU in an RU of the first type at a fixed position in a primary 20-MHz channel.

The radio frame for transmission of the data may include a HE SU PPDU, a HE MU PPDU, and a HE trigger-based PPDU in addition to the HE ER SU PPDU. If the data is transmitted in the HE MU PPDU or the HE trigger-based PPDU, the processor may use an RU of a third type having a size of 26 tones and an RU of a fourth type having a size of 52 tones in addition to an RU of the first type and an RU of the second type.

If the data is transmitted in the HE ER SU PPDU, the processor may not use an RU of the third type and an RU of the fourth type.

If the data is transmitted in the HE SU PPDU, a BW field of the HE-SIG A field may indicate a transmission BW of the HE SU PPDU among BWs being multiples of 20 MHz. If the data is transmitted in the HE ER SU PPDU, the BW field of the HE-SIG A field may indicate whether the HE ER SU PPDU uses an RU of the first type or an RU of the second type.

The processor may transmit the data in a data field of the HE ER SU PPDU in a repeated transmission scheme in which available resources of the data field are divided into two parts and the same information is repeatedly transmitted twice.

The HE-SIG A field may include a 1-bit field indicating whether the repeated transmission scheme is applied to the data field.

If the data is transmitted in the HE SU PPDU, an MCS field of the HE-SIG A field may indicate an applied MCS level in 4 bits. If the data is transmitted in the HE ER SU PPDU, the MCS field of the HE-SIG A field may represent only three or fewer MCS levels.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the present disclosure. In the drawings:

FIG. 11 is a view illustrating the concept of including, in HE-SIG A, a field indicating whether a repeated transmission scheme is applied to a Data field of a HE ER SU PPDU according to an embodiment of the present disclosure;

FIG. 12 is a view illustrating modulation and coding scheme (MCS) information in HE-SIG A of a HE ER SU PPDU according to an embodiment of the present disclosure;

FIG. 13 is a table illustrating a structure of HE-SIG A in a HE ER SU PPDU according to an embodiment of the present disclosure.

DETAILED DESCRIPTION OF THE INVENTION

Reference will now be made in detail to the preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

High Efficiency Physical Protocol Data Unit (HE PPDU) Types and Introduction of High Efficiency Extended Range Single User Physical Protocol Data Unit (HE ER SU PPDU)

Figure 2:
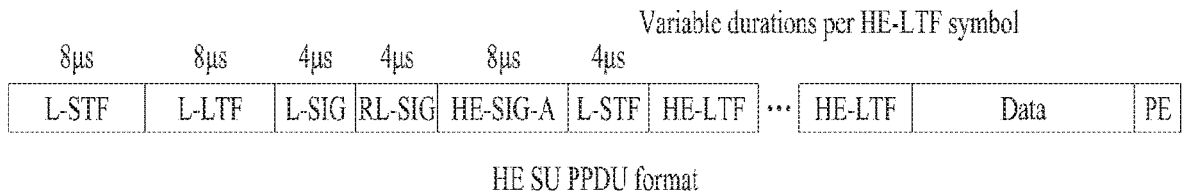
FIGS. 2 and 3 are views illustrating a HE single user (SU) PPDU format and a HE multi-user (MU) PPDU format, respectively, among HE PPDU formats which may be used in an embodiment of the present disclosure.
Figure 3:
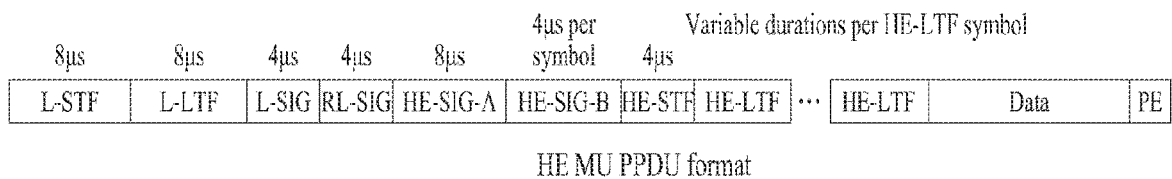

FIGS. 2 and 3 are views illustrating a HE single user (SU) PPDU format and a HE multi-user (MU) PPDU format among HE PPDU formats which may be used in an embodiment of the present disclosure;

A high efficiency (HE) system supports an SU transmission mode and an MU transmission mode. The HE SU PPDU illustrated in FIG. 2 may be used in the SU transmission mode, and the HE MU PPDU illustrated in FIG. 3 may be used in the MU transmission mode.

Figure 1:
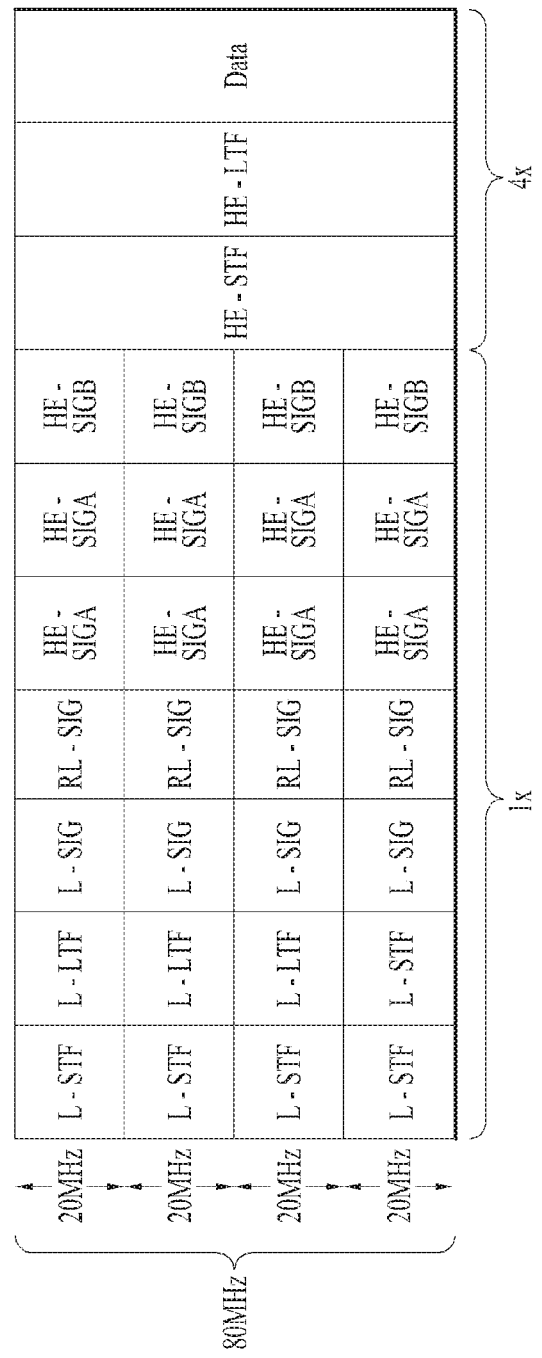
FIG. 1 is a view referred to for describing initial discussion of each element of a high efficiency physical protocol data unit (HE PPDU)

The HE SU PPDU does not need to include HE signal B (HE-SIG B) among the fields described with reference to FIG. 1 because HE-SIG B is used to transmit user-specific control information in the MU transmission mode, as described before. In the HE SU PPDU format, HE-SIG A is Bus long as illustrated in FIG. 2 and does not need to be repeated on a symbol basis, compared to a later-described HE ER SU PPDU.

Meanwhile, the HE MU PPDU illustrated in FIG. 3 is used in the MU transmission mode. The HE MU PPDU format may include HE-SIG B to transmit user-specific control information. The HE MU PPDU may also include an 8-us HE-SIG-A field.

Figure 4:
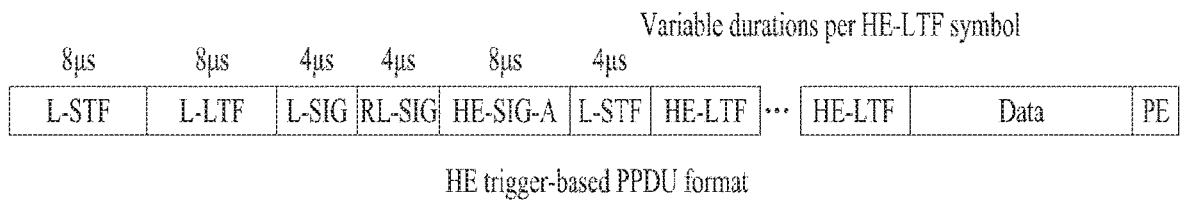
FIG. 4 is a view illustrating a HE trigger-based PPDU format among HE PPDU formats which may be used in an embodiment of the present disclosure.

FIG. 4 is a view illustrating a HE trigger-based PPDU format among HE PPDU formats which may be used in an embodiment of the present disclosure.

Aside from a HE MU PPDU used in the MU transmission mode as illustrated in FIG. 3, a HE trigger-based PPDU may be used as a PPDU transmitted in response to a trigger frame triggering uplink (UL) MU transmission, received from an access point (AP). Accordingly, a HE MU PPDU may be used mainly for downlink (DL) MU transmission as described later, whereas a HE trigger-based PPDU as illustrated in FIG. 4 may be used for UL MU transmission.

The HE trigger-based PPDU format illustrated in FIG. 4 is identical to the HE SU PPDU format illustrated in FIG. 2 in terms of the structures of legacy short training field (L-STF), legacy long training field (L-LTF), legacy signal (L-SIG), and HE-SIG-A fields, and different from the HE SU PPDU format in that the former may include a 8-us HE-STF field as illustrated in FIG. 4.

Figure 5:
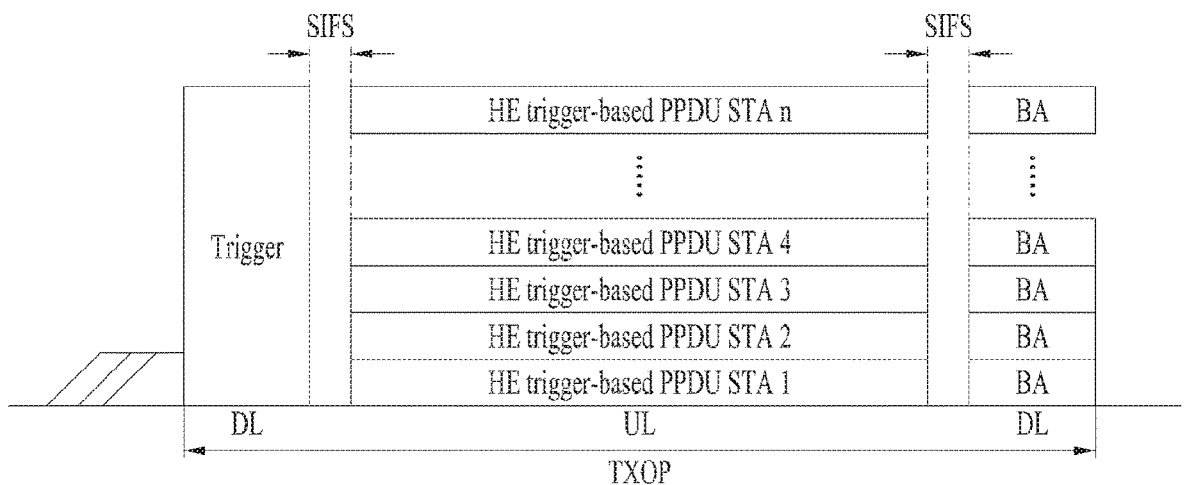
FIGS. 5 and 6 are views illustrating an uplink (UL) MU transmission scheme and a DL MU transmission scheme, respectively to describe an application example of each HE PPDU format.
Figure 6:
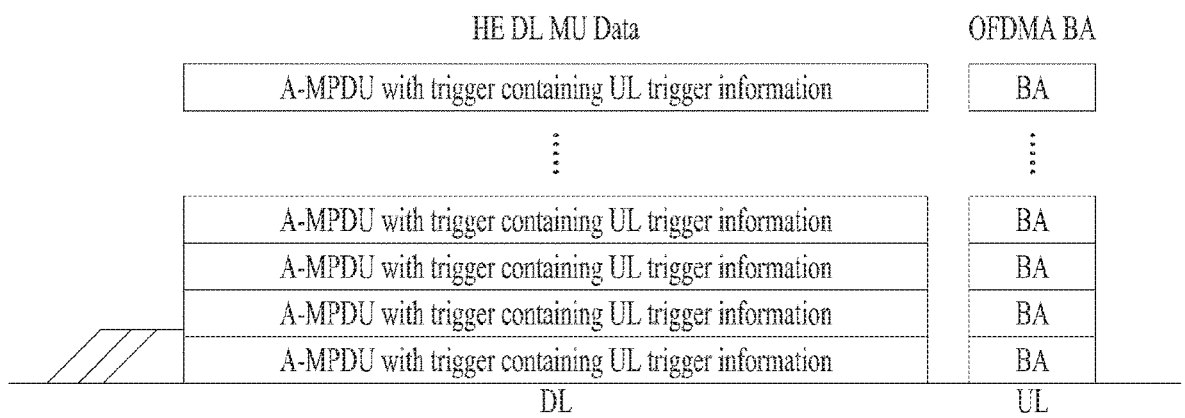

FIGS. 5 and 6 are views illustrating a UL MU transmission scheme and a DL MU transmission scheme, respectively to describe an application example of each HE PPDU format.

Specifically, FIG. 5 illustrates a UL MU transmission situation. Referring to FIG. 5, an AP may transmit a trigger frame on DL to schedule UL MU transmission of a plurality of STAs. The trigger frame may include scheduling information based on which the plurality of STAs transmit HE trigger-based PPDUs. Therefore, each STA may transmit a HE trigger-based PPDU as illustrated in FIG. 5. The HE trigger-based PPDU is configured in the manner described with reference to FIG. 4. The AP may transmit an acknowledge/negative acknowledgement (ACK/NACK) in response to a UL MU data transmission in the HE trigger-based PPDU. While the AP is shown as transmitting a block ACK (BA) in FIG. 5, the AP may use a general ACK frame, a BA frame, or a multi-STA BA frame of a format common to the plurality of STAs in order to acknowledge or negative-acknowledge the UL MU data transmissions.

FIG. 6 illustrates a DL MU transmission situation. Referring to FIG. 6, an AP may transmit DL data in a HE MU PPDU to a plurality of STAs during an acquired transmission opportunity (TXOP). The HE MU PPDU may include an aggregated MAC (medium access control) protocol data unit (A-MPDU) directed to each STA, as illustrated in FIG. 6. The HE MU PPDU used for DL MU transmission may be configured in the format illustrated in FIG. 3.

Each STA may transmit an ACK/NACK in the form of a BA in response to reception of the HE MU PPDU, as illustrated in FIG. 6. Scheduling information is required to enable each STA to transmit an ACK/NACK in MU. While a trigger frame may be separately used for scheduling, the HE MU PPDU transmitted by the AP may include scheduling information for BA transmission, as illustrated in FIG. 6, thereby increasing efficiency.

Figures 7, 8:
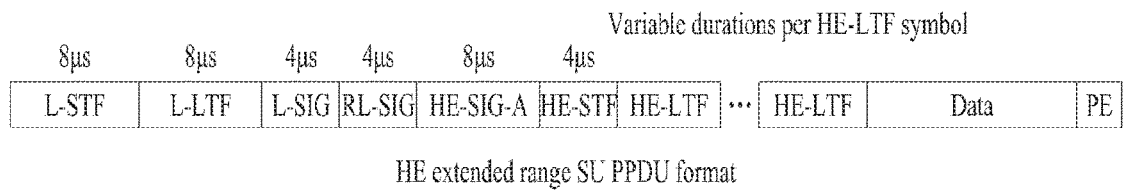
FIG. 7 is a view illustrating a high efficiency extended range single user physical protocol data unit (HE ER SU PPDU) format according to an embodiment of the present disclosure.
FIG. 8 is a view illustrating a structure of HE-SIG A in a HE SU PPDU used in an embodiment of the present disclosure.

FIG. 7 is a view illustrating a HE ER SU PPDU format according to an embodiment of the present disclosure.

For SU transmission, a HE SU PPDU may be used, as illustrated in FIG. 2. However, a STA needs a more robust type of transmission to extend coverage in a specific case in the HE system. A HE ER SU PPDU has been proposed to cover such an extended range, as illustrated in FIG. 7.

The HE ER SU PPDU may have the following features.

To ensure the reliability and robust transmission of HE-SIG A, the symbols of HE-SIG A are preferably repeated once and transmitted. In FIG. 7, HE-SIG A is 16 us long, which implies that each symbol of HE-SIG A in the HE SU PPDU of FIG. 2 is repeated once.

Further, it is preferred to boost the power of L-STF, L-LTF, HE-STF, and HE-LTF of the HE ER SU PPDU by 3 dB relative to L-STF, L-LTF, HE-STF, and HE-LTF of the HE SU PPDU, for robust performance against a channel.

The HE ER SU PPDU is transmitted on a 20-MHz primary channel, and preferably supports only one spatial stream (SS) and specific modulation and coding schemes (MCSs) (e.g., MCS0, MCS1, and MCS2). This simplifies the transmission structure of the HE ER SU PPDU used for robust transmission, and transmission of the HE ER SU PPDU with boosted power is favorable.

Based on the basic idea of a HE ER SU PPDU, a method for transmitting and receiving a HE ER SU PPDU will be described below in detail.

HE ER SU PPDU Transmission Scheme and Specific Configuration of HE-SIG A

Considering that a HE ER SU PPDU is a special case of a HE SU PPDU, the following description will be given of the difference between a HE SU PPDU transmission scheme and a HE ER SU PPDU transmission scheme.

FIG. 8 is a view illustrating a structure of HE-SIG A in a HE SU PPDU used in an embodiment of the present disclosure.

In the HE SU PPDU, HE-SIG A includes 1-bit information indicating whether the PPDU is for UL transmission or DL transmission. HE-SIG A further includes 1-bit format information indicating whether the PPDU is a HE trigger-based PPDU or a HE SU PPDU.

A bandwidth (BW) field of HE-SIG A may be 2 bits long to indicate the transmission BW of the HE SU PPDU among 20 MHz, 40 MHz, 80 MHz, and 160 MHz. An MCS field may indicate a used MCS level in 4 bits.

The information illustrated in FIG. 8 has been defined in 50 bits, with the usage of 2 bits not defined.

Now, a description will be given of a method for transmitting and receiving a HE ER SU PPDU based on the above-described information of a HE SU PPDU, and a configuration of HE-SIG A as signalling information for the method.

IEEE 802.11ax regulates data transmission in OFDMA as mandatory, and defines four types of resource units (RUs) as listed in [Table 1] below, for DL/UL transmission in a 20-MHz BW.

Figures 9, 10:
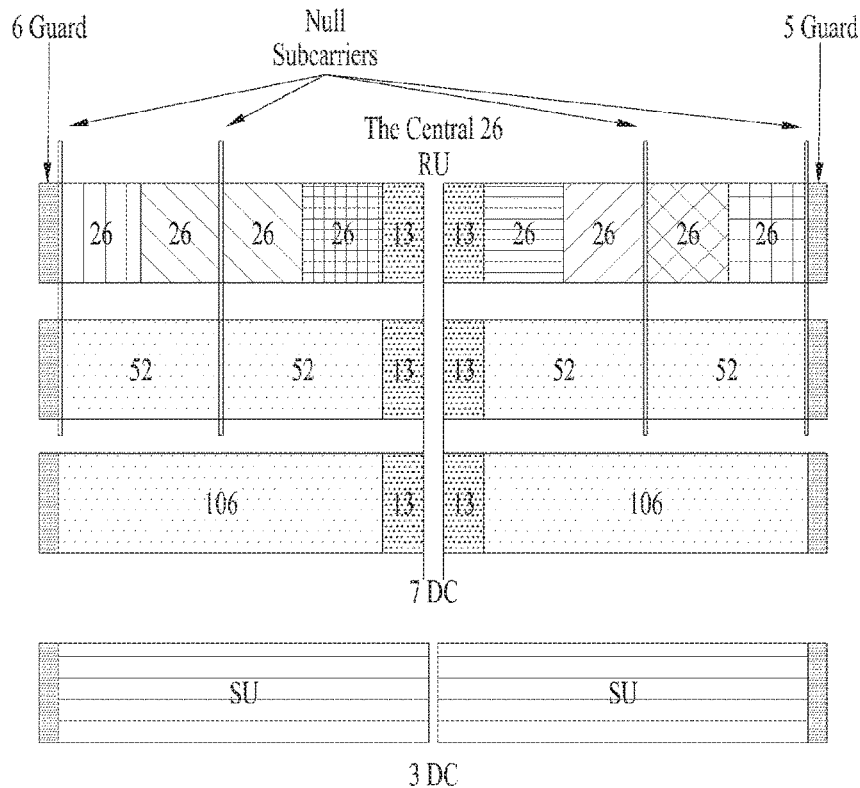
FIG. 9 is a view illustrating a tone allocation scheme used in a HE system.
FIG. 10 is a view illustrating a bandwidth (BW) field of HE-SIG A according to an embodiment of the present disclosure.

FIG. 9 is a view illustrating a tone allocation scheme used in a HE system.

[Table 1] below lists RU sizes and the numbers of RUs in 20 MHz by type, when tones are allocated in the manner illustrated in FIG. 9.

TABLE 1

| Size of RU | Number of RUs in 20 MHz |
|---|---|
| 26-tone RU | 9 |
| 52-tone RU | 4 |
| 106-tone RU | 2 |
| 242-tone RU | 1 |

For example, if data is transmitted in a HE MU PPDU and a HE trigger-based PPDU, the above four types of RUs may be available. Therefore, when a HE ER SU PPDU is transmitted in OFDMA according to an embodiment of the present disclosure, the four types of RUs may also be considered.

In this context, the following three approaches are considered.

(1) Method 1

All of the four types of RUs may be available in transmitting a HE ER SU PPDU. That is, one of the four RU sizes (types) is selected and data is transmitted in an RU of the selected size during ER PPDU transmission.

(2) Method 2

Only the 52-tone, 106-tone, and 242-tone RU types are used, among the four types of RUs.

(3) Method 3

Only the 106-tone or 242-tone RU type is used, among the four types of RUs.

(3) Method 4

Only the 242-tone RU type is used, among the four types of RUs.

In a preferred embodiment of the present disclosure, a HE ER SU PPDU transmission scheme based on Method 3 among the four approaches is used. The reason for preferring an RU of a large size among the available four types of RUs is that the use of a large RU requires less signalling information than use of a small RU and thus transmission is simplified, which is suitable for a HE ER SU PPDU for robust transmission.

However, if only the 242-tone RU type is used as in Method 4, a function of transmitting a signal adaptively according to a channel state is not viable, which is inefficient for robust transmission of a HE ER SU PPDU.

Further, the preferred embodiment of the present disclosure proposes a transmission scheme in which only 242-tone and 106-tone RUs are used as described before, and when 106 tones are used in 20 MHz, a HE ER SU PPDU is transmitted at a fixed position, thus obviating the need for additional signalling of the resource position. Therefore, if 106 tones are used, a HE ER SU PPDU is transmitted in a fixed 106-tone RU in primary 20 MHz, without the need for additional signalling.

Specific configurations of HE-SIG A under the above assumption will be described below.

Embodiment of Transmitting HE ER SU PPDU in 106-Tone/242-Tone RU at Fixed Position Another advantage of selectively using 106 tones or 242 tones for a HE ER SU PPDU is that the selection may be indicated simply by 1-bit control information. As described before, since the HE ER SU PPDU is transmitted in an RU type selected between the 106-tone RU type and the 242-tone RU type in primary 20 MHz, 2-bit information of the BW field of the HE ER SU PPDU, described with reference to FIG. 8, may not be needed.

Therefore, the unnecessary BW field may be reused to indicate whether the RU type is 106 tones or 242 tones in an embodiment of the present disclosure.

FIG. 10 is a view illustrating a BW field in HE-SIG A according to an embodiment of the present disclosure.

Referring to FIG. 10, the BW field of a HE SU PPDU indicates one of 20 MHz, 40 MHz, 80 MHz, and 160 MHz in 2 bits. On the other hand, only two out of four cases represented by a 2-bit BW field of a HE ER SU PPDU may indicate whether a used RU has 242 tones or 106 tones, as illustrated in FIG. 10. Obviously, additional control information may be transmitted using the other two cases in the HE ER SU PPDU.

If a HE ER SU PPDU is used, it may be configured that data is repeatedly transmitted, for robust data transmission in an embodiment of the present disclosure. That is, available resources in the Data field of the HE ER SU PPDU may be divided into two parts and data may be transmitted by repeatedly transmitting the same information twice.

For example, if the HE ER SU PPDU is transmitted in a 106-tone RU, the available 106 tones may be divided by 52 tones, data may be mapped to 52 tones, and the same data may be mapped to the remaining 52 tones, for repeated transmission.

For this purpose, HE-SIG A may include 1-bit control information indicating whether the above-described repeated transmission scheme is applied.

Dual carrier modulation (DCM) may be used as an example of the repeated transmission scheme. DCM may be regarded as repeated modulation of the same data to a pair of tones. However, when the same data is repeated, the second transmission data may be transmitted by phase rotation at a predetermined angle or conjugation.

FIG. 11 is a view illustrating the concept of including, in HE-SIG A, a field indicating whether a repeated transmission scheme is applied to a Data field of a HE ER SU PPDU according to an embodiment of the present disclosure.

While FIG. 11 illustrates DCM as the repeated transmission scheme by way of example, the repeated transmission scheme is not limited to DCM.

Referring to FIG. 11, a 1-bit DCM field indicates whether DCM is applied to the Data field by values 1 and 0. Since DCM is intended for robust transmission, DCM is preferably restricted to MCS levels equal to or lower than a predetermined level. In the example of FIG. 11, DCM is applied restrictively to MCS0, MCS1, MCS3, and MCS4. Further, DCM is limited to one or two spatial streams (SSs), not applied to space and time block code (STBC) in FIG. 11.

As described before, a HE SU PPDU indicates an MCS level using 4-bit information of HE-SIG A. In general, the HE SU PPDU may represent MCE level 0 to MCS level 11 by the 4-bit information. On the other hand, the HE ER SU PPDU according to the embodiment of the present disclosure may use only the three lowest MCS levels for robust transmission with minimal signaling. Thus, the MCS field of HE-SIG A may be simplified in the HE ER SU PPDU.

FIG. 12 is a view illustrating MCS information in HE-SIG A of a HE ER SU PPDU according to an embodiment of the present disclosure.

Referring to FIG. 12, the HE SU PPDU may indicate MCS level 0 to MCS level 11 using all of 4-bit information, whereas the HE ER SU PPDU may indicate only MCS0, MCS1, and MCS2.

More specifically, if 242 tones are used for transmission of the HE ER SU PPDU, one of MCS0, MCS1, and MCS2 is indicated, and if 106 tones are used for transmission of the HE ER SU PPDU, MCS0 is fixedly used.

FIGS. 10, 11, and 12 are purely exemplary, and specific formats may be different from those illustrated in FIGS. 10, 11, and 12. Because the HE ER SU PPDU uses fewer bits than the HE SU PPDU, the HE ER SU PPDU may represent additional control information by means of the remaining extra bits.

The above method for using 106 tones/242 tones at a fixed position is not the only embodiment of the present disclosure, and other alternative embodiments will be described below.

Embodiments Using Different Structures

A HE ER SU PPDU may be transmitted in an RU at a changed position, compared to the foregoing embodiment. The following examples may be considered.

(1) Best Band Selection with Power Boosting

As illustrated in [Table 1], when an RU size or type different from the 242-tone RU type is used, there are a plurality of RUs of the same size in 20 MHz. Therefore, a channel state and interference may vary according to the positions of RUs in a BW. Thus, once one RU size is selected from a given RU set, an RU location having a minimal channel influence and a minimal interference influence is selected for RU transmission and data is transmitted in an RU at the selected position. The signal transmitted in the RU is transmitted with power boosted as much as the number of RUs of the RU size.

For example, if the 106-tone RU type is used, there are two 106-tone RUs in 20 MHz. If the upper 106-tone RU is in a better channel state than the lower 106-tone RU, a signal is transmitted in the upper 106-tone RU. Since the signal is transmitted only one of the two RUs, the signal may be transmitted with power boosting. Accordingly, the power of the transmitted signal may be boosted by at least twice (3 dB) up to 3 dB+alpha in consideration of extra power available by not using central 26 tones.

(2) Repetition within 20 MHz

Once an RU size or type is determined for signal transmission, data is transmitted using the RU size. Herein, the data is repeatedly transmitted in RUs of the determined RU size in 20 MHz. For example, if the 52-tone RU type is used, there are four 52-tone RUs in 20 MHz, and thus the same data is repeatedly transmitted in the four 52-tone RUs.

Owing to repeated transmissions of the same data in RUs of the same size, diversity and repetition gains may be achieved.

Further, data may be repeated within a selected RU size. Data is repeated, each time in an RU size smaller than a given RU size for transmission. For example, if a signal is transmitted in a 106-tone RU, data is repeatedly transmitted, each time in an RU size of 52 tones.

An RU size for ER transmission is preferably equal to or larger than 52 tones. A transmission RU configured by repeating data in a smaller RU size may be transmitted in 20 MHz in Method 1, Method 2, or Method 3.

Further, a method for selecting an optimum band and an optimum RU size at the same time may be applied.

That is, a band or RU size in a good channel state with less interference is selected. Data is transmitted using the selected RU size. Specifically, the data is repeatedly transmitted in an RU size smaller than the selected RU size. For example, if an RU size used for transmission is 106 tones, a better RU between two 106-tone RUs is selected, and data is loaded in a 52-tone RU smaller than the RU size. The data is repeated on an 52-tone RU basis and thus transmitted in the 106-tone RU. The signal in the 106-tone RU is transmitted with power boosting as described in (1).

To transmit an ER PPDU using various RU sizes in the above manner, information about a transmission RU size or type or information about an RU size should be transmitted in HE-SIG A. Therefore, HE-SIG A included in the ER PPDU may be configured based on information of HE-SIG A included in an SU PPDU, as follows.

RU information for transmission of a HE SU ER PPDU may be indicated by modifying a part of the fields included in HE-SIG A of a legacy SU PPDU, in consideration of the afore-described remaining bits (e.g., 2 bits) of HE-SIG A in a HE SU PPDU, and the following ER transmission situations.

If a signal is transmitted based on best band selection with power boosting, an indication is made through HE-SIG A, as follows.

Case of Using Method 1

An RU size used for ER PPDU transmission may be indicated using reserved bits (i.e., 2 bits) of HE-SIG A in a HE SU PPDU. For example, if RU sizes available for transmission are 26, 52, 106, and 242 tones, a used RU size may be indicated using 2-bit information as follows.

TABLE 2

| 2 bit indices | RU size |
|---|---|
| 00 | 52 |
| 01 | 106 |
| 10 | 242 |
| 11 | Reserved (26) |

The above table is exemplary. Since four RU sizes are available, 2 bits are used. According to an RU size configuration used for transmission, each index may indicate a different RU size.

Since an ER PPDU is always transmitted in one SS, Nsts information included in HE-SIG A of a HE SU PPDU is not needed. Therefore, since information about an RU size used for transmission is transmitted in a field defined in the above example, the position of an RU carrying data may be determined, considering that the Nsts field indicates an RU allocation in ER transmission.

For example, each RU forms 20 MHz as illustrated in FIG. 9. In an embodiment of the present disclosure, it is assumed that RU locations are indicated sequentially from the left of the drawing. That is, it may be assumed that RUs are indicated in an order of low to high frequency indexes. This is a mere example, and thus ordering of positions is not limited in the present disclosure.

Thus, 3-bit allocation information may be configured as follows.

TABLE 3

| 3 Bit indices | Allocation of RU |
|---|---|
| 000 | First |
| 001 | Second |
| 010 | Third |
| 011 | $4^{th}$ |
| 100 | $5^{th}$ |
| 101 | $6^{th}$ |
| 110 | $7^{th}$ |
| 111 | $8^{th}$ |

Therefore, once an RU size is determined, each RU location is indicated as illustrated in [Table 4].

TABLE 4

| 3 Bit indices | Allocation of RU | | |
|---|---|---|---|
| | 26 tone RU | 52 tone RU | 106 tone RU |
| 000 | $1^{st}$ | $1^{st}$ | $1^{st}$ |
| 001 | $2^{nd}$ | $2^{nd}$ | $2^{nd}$ |
| 010 | $3^{rd}$ | $3^{rd}$ | x |
| 011 | $4^{th}$ | $4^{th}$ | x |
| 100 | $5^{th}$ | x | x |
| 101 | $6^{th}$ | x | x |
| 110 | $7^{th}$ | x | x |
| 111 | $8^{th}$ | x | x | x: non-use of the indication for a specific RU size.

The number of bits used for the allocation information may be changed according to a minimum RU size used for transmission. For example, if all RU sizes are available, 26-tone RUs are at most positions. Since the number of 26-tone RUs except for central 26 tones is 8, an RU location may be indicated in 3 bits. Regarding other RU sizes except the 26-tone RU size, however, if the 52-tone RU size is used, there are four 52-tone RUs. Then, an RU location may be indicated only in 2 bits. If the minimum RU size is 106 tones, an RU location may be indicated in 1 bit.

[Table 5] below illustrates a case with a minimum RU size of 52 tones, and [Table 6] below illustrates a case with a minimum RU size of 106 tones.

TABLE 5

| 2 Bit indices | Allocation of RU |
|---|---|
| 00 | $1^{st}$ |
| 01 | $2^{nd}$ |
| 10 | $3^{rd}$ |
| 11 | $4^{th}$ |

TABLE 6

| 1 Bit indices | Allocation of RU |
|---|---|
| 0 | $1^{st}$ |
| 1 | $2^{nd}$ |

FIG. 13 is a table illustrating a structure of HE-SIG A in a HE ER SU PPDU according to an embodiment of the present disclosure.

Specifically, FIG. 13 illustrates HE-SIG A configured based on the description given with reference to [Table 2] to [Table 6].

In FIG. 13, reference numeral 1310 denotes use of 2 reserved bits in a HE SU PPDU, and reference numeral 1320 denotes reuse of an Nsts field in a HE SU PPDU.

As illustrated in FIG. 13, information needed for transmission of a HE ER SU PPDU may be transmitted in a field unnecessary for the HE ER SU PPDU among the fields of HE-SIG A in a HE SU PPDU.

Figure 14:
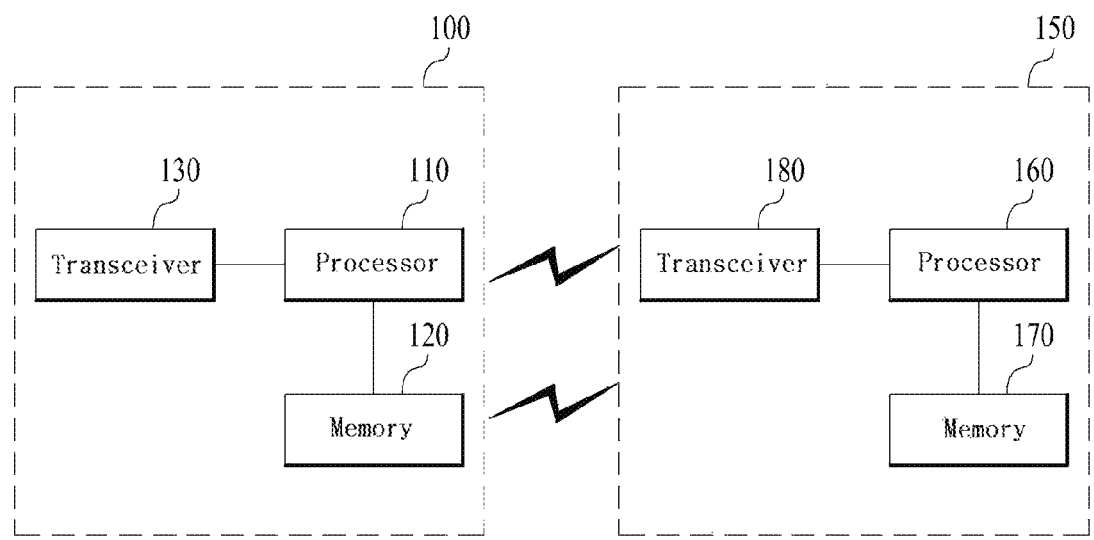
FIG. 14 is a block diagram illustrating exemplary configurations of an access point (AP) (or base station (BS)) and a station (STA) (or user equipment (UE)) according to an embodiment of the present disclosure.

FIG. 14 is a block diagram of apparatuses for performing the above-described methods.

Referring to FIG. 14, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing HE ER SU PPDU transmission/reception.

The processors 110 and 160 and/or the transceivers 130 and 180 may include Application-Specific Integrated Circuit (ASICs), other chip sets, logic circuits, and/or data processors. The memories 120 and 170 may include read only memories (ROMs), random access memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, a STA can efficiently configure and transmit/receive a HE ER SU PPDU for robust transmission according to an embodiment of the present disclosure.

While the present disclosure has been described above in the context of an IEEE 802.11 WLAN system, the present disclosure is not limited thereto. The present disclosure is applicable in the same manner to various wireless systems.

The detailed description of the preferred embodiments of the present disclosure has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

What is claimed is:

1. A method for transmitting a physical protocol data unit (PPDU) by a first station (STA) in a wireless local area network (WLAN) system, the method comprising:
configuring the PPDU for transmission of data; and
transmitting the PPDU to a second STA in a resource unit (RU) of at least one of a first type, a second type, a third type or a fourth type, the first type having a size of 106 tones, the second type having a size of 242 tones, the third type having a size of 26 tones, and the fourth type having a size of 52 tones,
wherein the PPDU comprises at least one of a high efficiency extended range single user PPDU (HE ER SU PPDU) or a HE single user PPDU (HE SU PPDU),
wherein the first STA uses different RU selection schemes based on whether the PPDU is the HE ER SU PPDU or the HE SU PPDU,
wherein the first STA uses only at least one of a RU of the first type or the second type in response that the PPDU is the HE ER PPDU,
wherein the RU of the first type includes at least one of a first-first type RU or a second-first type RU within a primary 20 MHz,
wherein the first STA uses only the first-first type RU among the first-first type RU and the second-first type RU in response that the PPDU is the HE ER PPDU and the RU of the first type is used, and wherein the first STA uses a RU of at least one of the first type, the second type, the third type or the fourth type in response that the PPDU is the HE SU PPDU.

2. The method according to claim 1,
wherein the PPDU for transmission of the data further comprises at least one of:
a HE multi-user PPDU (HE MU PPDU), or
a HE trigger-based PPDU, and
wherein if the PPDU is the HE MU PPDU or the HE trigger-based PPDU, at least one of the RU of the first type, the second type, the third type or the fourth type is used.

3. The method according to claim 1, wherein if the PPDU is the HE ER SU PPDU, the RU of the third type and the fourth type are not used.

4. The method according to claim 1,
wherein if the PPDU is the HE SU PPDU, a bandwidth (BW) field of a HE-SIG A field indicates a transmission BW of the HE SU PPDU among BWs being multiples of 20 MHz, and
wherein if the PPDU is the HE ER SU PPDU, the BW field of the HE-SIG A field indicates whether the HE ER SU PPDU uses the RU of the first type or the second type.

5. The method according to claim 4, wherein the data is transmitted in a data field of the HE ER SU PPDU in a repeated transmission scheme in which available resources of the data field are divided into two parts and the same information is repeatedly transmitted twice.

6. The method according to claim 5, wherein the HE-SIG A field includes a 1-bit field indicating whether the repeated transmission scheme is applied to the data field.

7. The method according to claim 1,
wherein if the PPDU is the HE SU PPDU, a modulation and coding scheme (MCS) field of a HE-SIG A field indicates an applied MCS level in 4 bits, and
wherein if the PPDU is the HE ER SU PPDU, the MCS field of the HE-SIG A field represents only three or fewer MCS levels.

8. A station (STA) for transmitting a physical protocol data unit (PPDU) in a wireless local area network (WLAN) system, the STA comprising:
a processor for configuring the PPDU for transmission of the data; and
a transceiver for transmitting the PPDU,
wherein the transceiver transmits the PPDU in a resource unit (RU) of at least one of a first type, a second type, a third type or a fourth type, the first type having a size of 106 tones, the second type having a size of 242 tones, the third type having a size of 26 tones and the fourth type having a size of 52 tones, and
wherein the PPDU comprises at least one of a high efficiency extended range single user PPDU (HE ER SU PPDU) or a HE single user PPDU (HE SU PPDU),
wherein the first STA uses only at least one of a RU of the first type or the second type in response that the PPDU is the HE ER PPDU,
wherein the RU of the first type includes at least one of a first-first type RU or a second-first type RU within a primary 20 MHz,
wherein the first STA uses only the first-first type RU among the first-first type RU and the second-first type RU in response that the PPDU is the HE ER PPDU and the RU of the first type is used, and
wherein the first STA uses a RU of at least one of the first type, the second type, the third type or the fourth type in response that the PPDU is the HE SU PPDU.

9. The STA according to claim 8,
wherein the PPDU for transmission of the data further comprises at least one of:
a HE multi-user PPDU (HE MU PPDU), or
a HE trigger-based PPDU, and
wherein if the PPDU is the HE MU PPDU or the HE trigger-based PPDU, at least one of the RU of the first type, the second type, the third type or the fourth type is used.

10. The STA according to claim 8, wherein if the PPDU is the HE ER SU PPDU, the processor does not use the RU of the third type and the fourth type.

11. The STA according to claim 8,
wherein if the PPDU is the HE SU PPDU, a bandwidth (BW) field of a HE-SIG A field indicates a transmission BW of the HE SU PPDU among BWs being multiples of 20 MHz, and
wherein if the PPDU is the HE ER SU PPDU, the BW field of the HE-SIG A field indicates whether the HE ER SU PPDU uses the RU of the first type or the second type.

12. The STA according to claim 11, wherein the processor transmits the data in a data field of the HE ER SU PPDU in a repeated transmission scheme in which available resources of the data field are divided into two parts and the same information is repeatedly transmitted twice.

13. The STA according to claim 12, wherein the HE-SIG A field includes a 1-bit field indicating whether the repeated transmission scheme is applied to the data field.

14. The STA according to claim 8,
wherein if the PPDU is the HE SU PPDU, a modulation and coding scheme (MCS) field of a HE-SIG A field indicates an applied MCS level in 4 bits, and
wherein if the PPDU is the HE ER SU PPDU, the MCS field of the HE-SIG A field represents only three or fewer MCS levels.

* * * * *